United States Patent Office 3,550,433
Patented Dec. 29, 1970

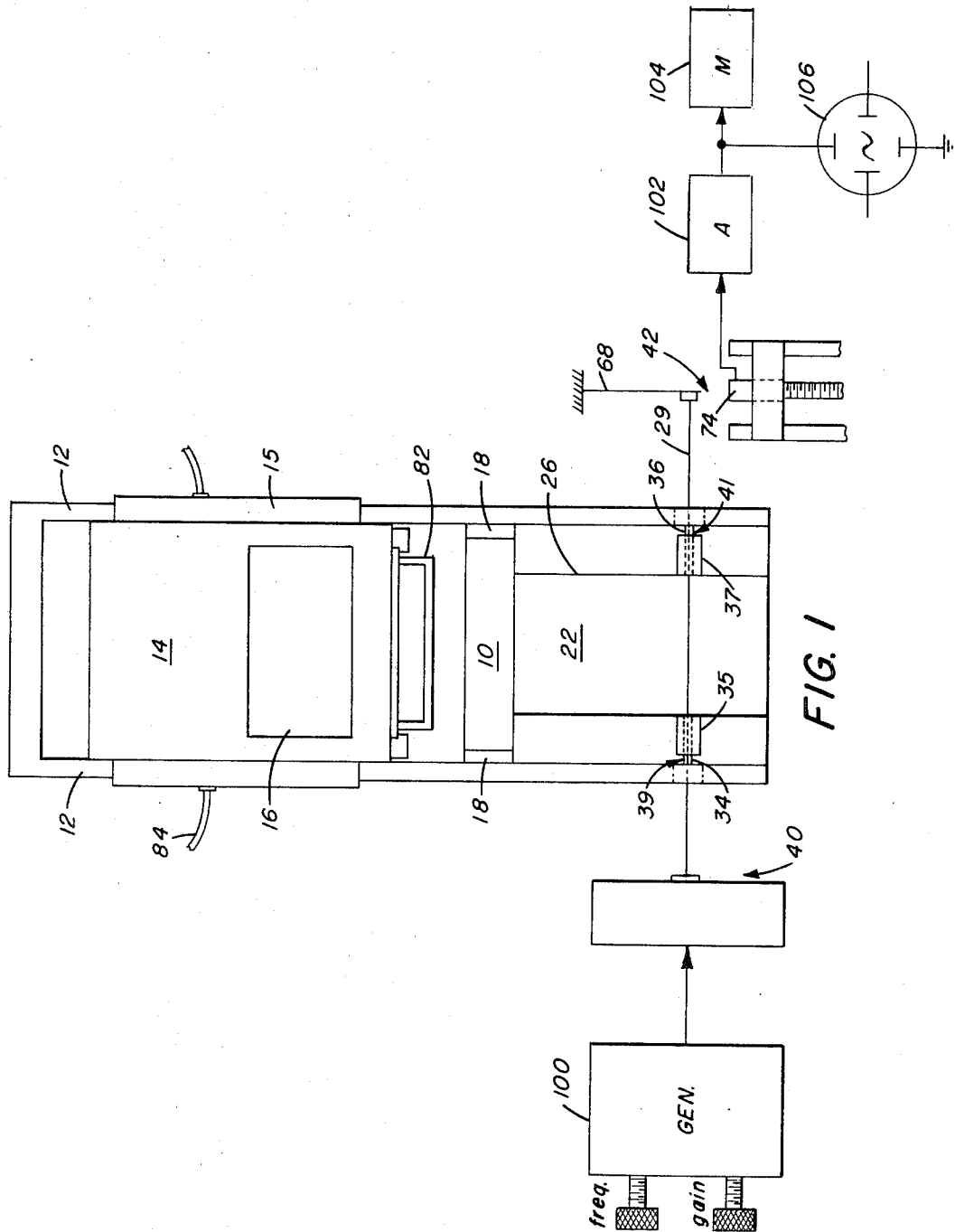

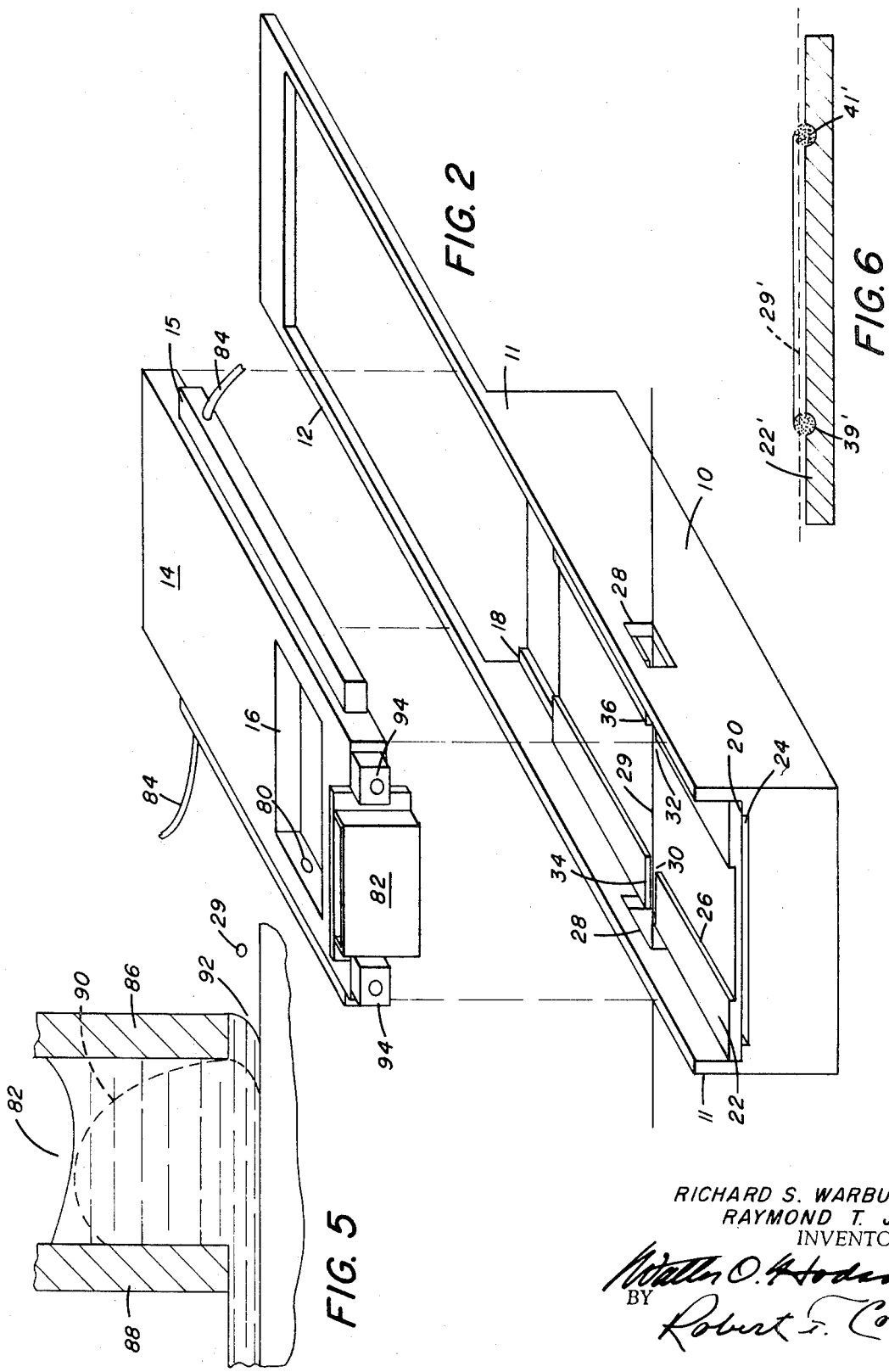

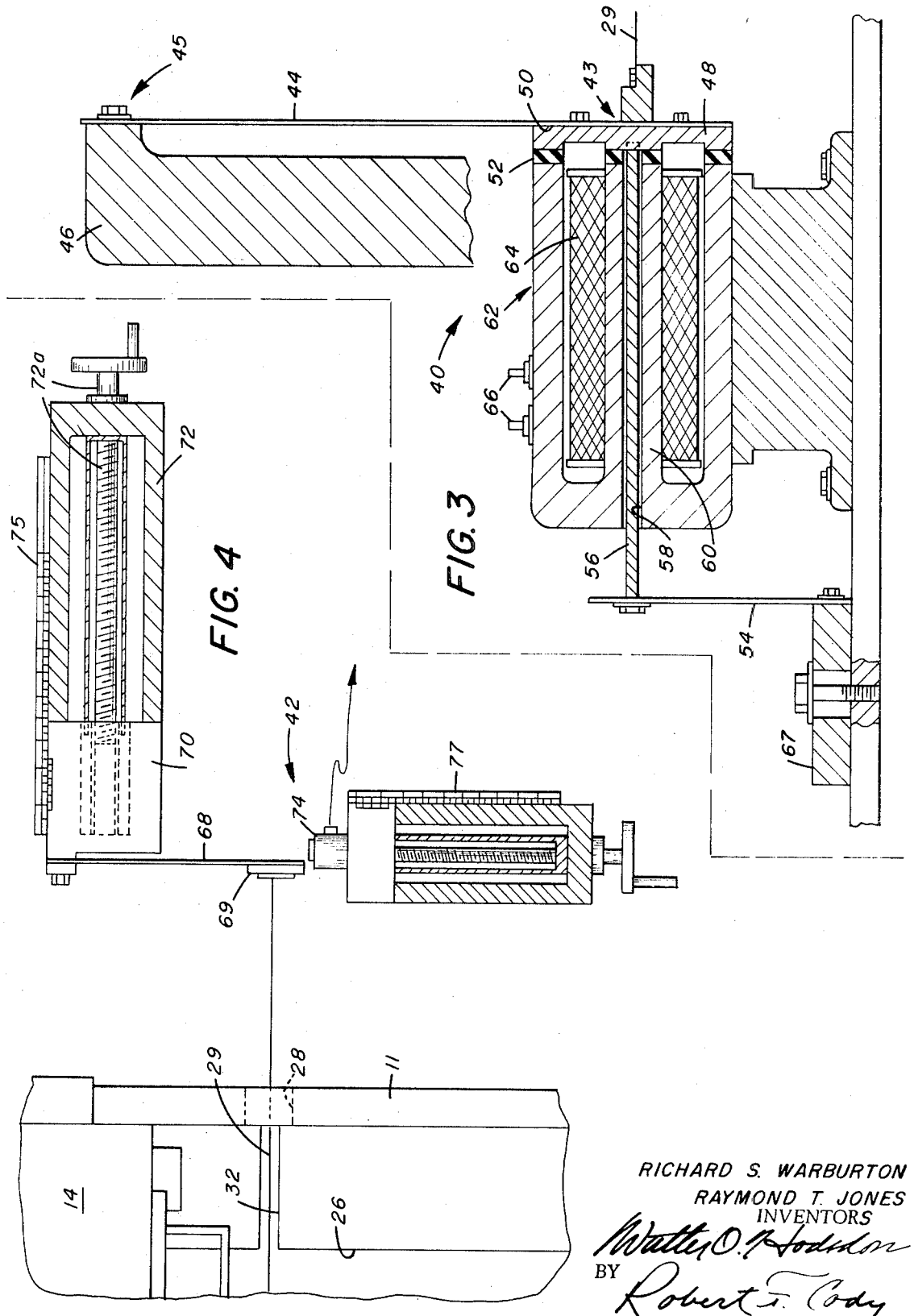

1

3,550,433
VISCOSITY RESPONSIVE APPARATUS
Richard S. Warburton and Raymond T. Jones, Rochester, N.Y., assignors to Eastman Kodak Company, Rochester, N.Y., a corporation of New Jersey
Filed June 11, 1969, Ser. No. 832,174
Int. Cl. G01n 11/16
U.S. Cl. 73—54                                    7 Claims

ABSTRACT OF THE DISCLOSURE

A viscosimeter for measuring the dynamic viscosity of a thin fluid film employs viscous damping as the basis of its measurement. A wire, cooperative with a vibratory driver and spring receiver, is immersed within the film; and tensions are set so that standing waves and heat producing vibrations do not occur along or within the wire. Means are provided for preventing the film from prematurely hardening to the wire at the film edges.

BACKGROUND OF THE INVENTION (1) Field of the invention

This invention relates in general to viscosimeters. In its presently preferred form, the invention is adapted to measure the dynamic viscosity of a thin fluid film; especially the viscosity of a thin fluid film which dries quickly.

(2) Description relative to the prior art

Photographic film base is frequently made by coating dope on a surface; and then stripping the coating after it dries, from such surface. The continuing need for lower cost dopes necessitates considerable experimentation as to the characteristics of various dopes; and in-line experimentation of and with such dopes during manufacture of film base is quite impractical.

Various viscosimeters are known and/or available, e.g. the viscosimeters indicated in U.S. Pats. 2,839,915, 2,849,875, 3,282,084. These viscosimeters are concerned with the viscosity of fluids contained within vessels or the like. They are not concerned with the viscosity of a thin fluid film—especially where the viscosity of that film is a dynamic one.

Measuring viscosity is commonly by use of dashpot techniques; i.e. the rate at which the vibrations of a vibratory probe, immersed in a fluid, are damped is representative of the viscosity of such fluid. The physical dimensions of a fluid film place difficult-to-meet demands on probes adapted to measure film viscosity. And, when the film in question is one which dries quickly, the immediate interaction between film surface and probe (hereinafter sometimes referred to as edge-effects) tends to destroy meaningful measurement of viscosity within the film.

SUMMARY OF THE INVENTION

While the invention employs dashpot techniques to measure film viscosity, it does so without resort to a vibratory probe. Rather, the invention indicates the to-and-fro (longitudinal) motion of a sensing wire immersed within a film, damping of such motion being indicative of film viscosity: Vibrations of and within the wire are prevented since such vibrations effectively heat the film, and thereby corrupt the viscosity measurement.

An aspect of the invention is the provision of means for preventing untimely drying of the film (edge-effects) in the region where the sensing wire enters the film. This, as well as other features of the invention, will be described below:

An object of the invention is to provide apparatus for measuring the viscosity of a fluid film.

Another object of the invention is to provide apparatus for measuring the dynamic viscosity of a fluid film.

Another object of the invention is to provide a test tool for simulating the action of a coating hopper in laying down a fluid film; and for measuring the viscosity of such film.

The invention will be described with reference to the figures wherein:

FIG. 1 is a plan view of apparatus embodying the invention and illustrating, among other things, a bed and cover assembly; a driver; a receiver; and a spreader assembly, FIG. 2 is an exploded view, in perspective, illustrating the bed and cover assembly of the apparatus of FIG. 1, FIG. 3 is a side elevational view, in section, illustrating the driver of the apparatus of FIG. 1, FIG. 4 is a plan view illustrating the receiver of the apparatus of FIG. 1, FIG. 5 indicates the action of the spreader assembly of the apparatus of FIG. 1, and FIG. 6 illustrates a way to avoid the edge-effects of fast drying fluid films.

Referring to FIGS. 1 through 4, a support 10, having upstanding sides 11, is provided with guide rails 12. A cover 14, having bearings 15, is cradled between the rails 12, and is slideable on such rails. The cover 14 is provided with a vent 16; and such cover may be positioned so that its vent 16 occupies the position indicated in phantom in FIG. 1.

The support 10 is provided with shoulders 18, 20 on which a coating plate 22 rest—a sheet of air (24) occupying the space between the support 10 and the underside of the coating plate 22. The sheet of air (24) serves to stabilize the temperature of the coating plate 22; and the top face of the coating plate 22 is provided with a broad channel 26 therein. The upstanding sides 11 of the support 10 are provided with respective apertures 28, through which a tensilely stiff thin wire 29 is disposed, and stretched across the coating plate 22. The broad channel 26 in the coating plate 22 is interrupted at locations 30, 32, whereby the wire 29 may reside within notches 34, 36 without contacting the coating plate 22. Covers 35, 37 are provided for the respective notches 34, 36; and such covers are so securely disposed over the notches that—when a fluid film is spread across such covers 34, 36, and over the wire 29—tunnels of air 39, 41 meet the faces of the fluid film through which the wire passes. This is an extremely important aspect of the invention, and serves to eliminate edge-effects while making viscosity measurements of quick drying films.

The wire 29 is stretched between a driver unit 40 and a receiver unit 42.

Referring to FIG. 3, the wire 29 is secured to one end 43 of a (driver 40) stiff reed 44, the other end 45 of which is secured to a bracket 46. An armature 48 of magnetic material is secured to the face 50 of the reed 44 at its "wired" end; and such armature 48 is spring loaded against a rubber cushion 52 by means of a leaf spring 54 connected to the armature via a drive rod 56. The drive rod 56 passes through a channel 58 in the core 60 of a pole piece 62; and about which core 60 a coil 64 is wound. The coil 64 is electrically excited via contacts 66. The drive rod 56 is so disposed that it does not touch the sides of the channel 58; and the force of the armature 48 against its cushion 52 may be set by means of an adjustable slide 67.

FIG. 4 indicates that the wire 29 is also secured, via an armature 69, to a flexible reed 68 of the receiver unit 42. Tension in the wire 29 may be adjusted by positioning a slide 70 to which the reed 68 is secured. The slide 70 is positionable in and along a bracket 72 by means of a screw-and-crank assembly 74; and as will appear below, it is an important feature of the invention that the wire 29 tension be adjustable by this (or other) means. The amount of wire tension is indicated by means of a scale 75 along which the slide is positioned.

Cooperative with the armature 69 is a pickup (coil) 74; the gap between the pickup 74 and the armature 69 (i.e. the sensitivity of the receiver unit 42) is adjustable in the same way that the tension of the wire 29 is set. A scale 77 is provided to indicate this adjustment.

Referring to FIG. 2, the bearings 15 are preferably hollow; and such hollows communicate with the vent 16—via orifices 80—and with conduits 84. The vent may be covered (by means not shown); and various pressures, and gases, may be applied to the vent (16) area via the conduits 84, thereby to control the atmosphere to which the fluid film under inspection is exposed.

At the forward end of the cover 14, a spreader assembly 82 is provided for forming fluid films. The spreader assembly is in the form of a coating hopper; and the spreader assembly is so formed not only to simulate the action of a hopper, but to assure that the hopper fluid which actually gets spread into a film is not predried. FIG. 5 indicates this effect: Were the leading edge (86) of the hopper removed—film spreading to be by the trailing edge (88) of the hopper—there would be a tendency to lay a drying (or dried) fluid film 90 on and over the wire 29, thereby preventing meaningful measurements of film viscosity. With the indicated technique, the film layer which is deposited never has any more than minimal contact with the air (at 92); and whatever film drying is caused by such contact is either disposed of long before the wire 29 gets immersed or (because the amount of dried fluid is so small) it is quickly liquified by, and dissolves back into, the film which is to be investigated.

Clamps 94 are provided so that the spreader assembly 82 may be set for various film thicknesses.

FIG. 1 indicates that the winding 64 of the driver unit 40 is electrically excited by a generator 100, the frequency and gain of which are adjustable; and signals produced at the receiver unit 42 are applied to an amplifier 102, and thence to a recorder or meter 104 for indicating the magnitude of the receiver unit output signal. The meter may be calibrated in units of viscosity, e.g. units of "poise;" and an oscilloscope 106 monitors the signal produced by the receiver unit 42.

OPERATION

With the generator 100 set to produce an excitation signal of a given frequency, the wire 29 tension is set, by adjustment of the screw-and-crank assembly 74, until a sine wave of the given frequency appears on the face of the oscilloscope. Thus, there are no standing vibratory waves travelling along or within the wire 29; and the wire cyclically moves to-and-fro in the direction of its own longitudinal axis. That is, the driver unit 40 pulls on the wire 29 to flex the reed 68; the reed 68 then pulls on the wire 29; then the driver pulls on the wire 29, etc. The cover 14 is positioned so that the spreader assembly is over the coating plate 22; and the spreader assembly 82 is filled with coating fluid, say of a quick drying dope. The cover 14 is slid on its bearings 15 along the upstanding sides 11 until the vent 16 occupies the position indicated in phantom on FIG. 1. And as soon as the cover 14 is so positioned, the amplitude of the output signal from the receiver unit 42 to the meter 104 (and the oscilloscope signal) starts to decrease to reflect the gradual buildup of viscosity within the film as the film dries through the vent 16. That film viscosity is validly indicated is borne by: (a) preventing heat-producing vibrations of and within the wire 29; and (b) preventing the film faces through which the wire passes from hardening to the wire, which hardening would cause edge-effects and, attendantly, spurious viscosity indications. Such hardening of the fluid film to the wire 29 is prevented because the faces of the fluid film through which the wire 29 passes are exposed to small tunnels of air 39, 41 which effectively entrap vapors of the fluid under inspection, and thereby prevent the faces in question from prematurely hardening to the wire 29.

Newtonian fluids, and films thereof, have sheer rates (viscosities) which vary linearly with sheer stress frequency; non-newtonian fluids, and films thereof, have sheer rates which do not vary linearly with the frequency of sheer stress. By varying the output frequency of the generator 100, fluids (and films thereof) may be determined as being either newtonian or non-newtonian, the former indicating a linear viscosity record for the various excitation frequencies; and the latter indicating a non-linear viscosity record for the various frequencies. Thus, not only can the above-described apparatus indicate whether a fluid (or film) is newtonian or non-newtonian; but once such fact is known, the various characteristics of the non-newtonian fluid (or film) in question may be determined by varying the frequency of the generator 100; by varying film thickness (94); by varying atmospheric conditions (16, 15, 84); etc.

The invention has been described in detail with particular reference to a preferred embodiment thereof, but it will be understood that variations and modifications can be effected within the spirit and scope of the invention. For example, instead of employing tunnels of air 39, 41 to assure against hardening of a quick drying film to the wire 29, it would be possible, and within the scope of the invention to prevent such hardening by use of a coating plate 22' (FIG. 6) having receptacles 39' and 41'. Solvent for the fluid under investigation fills the receptacles 39' and 41'; and the wire 29' is stretched over the receptacles. Thus, as the solvent evaporates, it retards the tendency of the fluid film to harden to the wire 29' at its penetration points.

We claim:

1. Apparatus responsive to the viscosity of a fluid comprising:
   (a) first and second spaced apart resilient means,
   (b) a wire stretched between said resilient means, and adapted to be immersed within said fluid,
   (c) means for cyclically flexing said resilient means, thereby to move said wire to-and-fro, in said fluid and in the direction of the longitudinal axis of said wire, and
   (d) means for varying the tension in said wire to cancel vibrations of and within said wire.

2. The apparatus of claim 1 including a plate, and means for spreading said fluid into a film on and across said plate, said plate being so disposed with respect to said wire that said wire is immersed in and runs parallel to the said film.

3. The apparatus of claim 2 including means for retarding the drying of said fluid film at the faces thereof where said wire pierces said film.

4. The apparatus of claim 3 wherein said means for retarding film drying is means for defining tunnels through which said wire passes immediately after piercing said film.

5. The apparatus of claim 3 wherein said plate is provided with receptacles proximate the points where said wire pierces said film, said receptacles being adapted to be filled with solvent for the said fluid.

6. The apparatus of claim 2 wherein said spreading means is a hopper, and wherein said apparatus includes means for varying the atmospheric conditions to which said film is exposed.

7. The apparatus of claim 1 including means for varying the frequency at which said resilient means are cyclically flexed.

References Cited

UNITED STATES PATENTS

| 2,656,714 | 10/1953 | Cartier | 73—67.8 |
| 2,849,875 | 9/1958 | De Maria | 73—54 |

LOUIS R. PRINCE, Primary Examiner

J. W. ROSKOS, Assistant Examiner

U.S. Cl. X.R.

118—9